(12) United States Patent
Patel et al.

(10) Patent No.: US 9,205,710 B2
(45) Date of Patent: *Dec. 8, 2015

(54) METHODS AND SYSTEMS FOR DETERMINING A TIRE PRESSURE STATUS

(71) Applicant: Ford Global Technologies, LLC, Dearborn, MI (US)

(72) Inventors: Dilip B. Patel, Novi, MI (US); Steven Yellin Schondorf, Dearborn, MI (US); John Robert Van Wiemeersch, Novi, MI (US); Brian Bennie, Sterling Heights, MI (US); Gregory Swadling, Milford, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/947,533

(22) Filed: Jul. 22, 2013

(65) Prior Publication Data

US 2013/0311033 A1   Nov. 21, 2013

Related U.S. Application Data

(63) Continuation of application No. 12/712,669, filed on Feb. 25, 2010, now Pat. No. 8,525,657.

(51) Int. Cl.
*B60C 23/00* (2006.01)
*B60C 23/04* (2006.01)
*B60R 25/00* (2013.01)

(52) U.S. Cl.
CPC ......... *B60C 23/0408* (2013.01); *B60C 23/0401* (2013.01); *B60C 23/0406* (2013.01); *B60C 23/0462* (2013.01); *B60C 23/0484* (2013.01); *B60R 25/00* (2013.01)

(58) Field of Classification Search
None
See application file for complete search history.

(56) References Cited

U.S. PATENT DOCUMENTS

| 4,797,671 A | 1/1989 | Toal, Jr. |
| 4,804,937 A | 2/1989 | Barbiaux et al. |

(Continued)

FOREIGN PATENT DOCUMENTS

| CN | 1646337 A | 7/2005 |
| CN | 1942749 A | 4/2007 |

(Continued)

OTHER PUBLICATIONS

Chinese Patent Office, First Office Action for the corresponding Chinese Patent Application No. 201110039418.X mailed May 27, 2014.

Office Action mailed Nov. 6, 2014 from the Chinese Patent Office for Application No. 201110039418.X.

(Continued)

*Primary Examiner* — Julie Lieu
(74) *Attorney, Agent, or Firm* — Jennifer M. Stec; Brooks Kushman P.C.

(57) ABSTRACT

Various embodiments may include methods and systems for determining a tire pressure status. The system may include at least one computer. An input defining an inflation status of one or more vehicle tires, as well as tire inflation data of the one or more tires, may be received. A specific value associated with an inflation event of the one or more vehicle tires may be calculated based on the inflation data. Further, one or more messages for outputting the specific value from one or more vehicle components may be generated and transmitted to the one or more vehicle components. The specific value may be output as one or more messages from the vehicle.

15 Claims, 6 Drawing Sheets

(56) References Cited

U.S. PATENT DOCUMENTS

| | | |
|---|---|---|
| 5,355,511 A | 10/1994 | Hatano et al. |
| 5,432,841 A | 7/1995 | Rimer |
| 5,633,484 A | 5/1997 | Zancho et al. |
| 5,654,686 A | 8/1997 | Geschke et al. |
| 5,732,074 A | 3/1998 | Spaur et al. |
| 5,758,300 A | 5/1998 | Abe |
| 5,889,468 A | 3/1999 | Banga |
| 5,942,979 A | 8/1999 | Luppino |
| 5,943,206 A | 8/1999 | Crayford |
| 5,963,129 A | 10/1999 | Warner |
| 5,986,543 A | 11/1999 | Johnson |
| 5,993,397 A | 11/1999 | Branson |
| 6,025,777 A | 2/2000 | Fuller et al. |
| 6,037,676 A | 3/2000 | Foree |
| 6,067,009 A | 5/2000 | Hozuka et al. |
| 6,104,931 A | 8/2000 | Havinis et al. |
| 6,292,095 B1 | 9/2001 | Fuller et al. |
| 6,295,449 B1 | 9/2001 | Westerlage et al. |
| 6,339,736 B1 | 1/2002 | Moskowitz et al. |
| 6,343,220 B1 | 1/2002 | Van Der Salm |
| 6,370,472 B1 | 4/2002 | Fosseen |
| 6,377,890 B1 | 4/2002 | Doi |
| 6,415,210 B2 | 7/2002 | Hozuka et al. |
| 6,429,773 B1 | 8/2002 | Schuyler |
| 6,435,018 B1 | 8/2002 | Murakami et al. |
| 6,441,732 B1 | 8/2002 | Laitsaari et al. |
| 6,470,732 B1 | 10/2002 | Breton |
| 6,487,478 B1 | 11/2002 | Azzaro et al. |
| 6,525,643 B1 | 2/2003 | Okada et al. |
| 6,571,617 B2 | 6/2003 | Van Niekerk et al. |
| 6,587,040 B2 | 7/2003 | Seto |
| 6,611,740 B2 | 8/2003 | Lowrey et al. |
| 6,612,165 B2 | 9/2003 | Juzswik et al. |
| 6,629,031 B2 | 9/2003 | Gustavsson et al. |
| 6,671,609 B2 | 12/2003 | Nantz et al. |
| 6,691,025 B2 | 2/2004 | Reimer |
| 6,732,031 B1 | 5/2004 | Lightner et al. |
| 6,738,697 B2 | 5/2004 | Breed |
| 6,825,758 B1 | 11/2004 | Laitsaari |
| 6,832,708 B2 | 12/2004 | Sinai |
| 6,839,614 B1 | 1/2005 | Timko et al. |
| 6,845,314 B2 | 1/2005 | Fosseen |
| 6,847,872 B2 | 1/2005 | Bodin et al. |
| 6,853,853 B1 | 2/2005 | Van Wiemeersch et al. |
| 6,868,358 B2 | 3/2005 | Brown, Jr. |
| 6,892,052 B2 | 5/2005 | Kotola et al. |
| 6,930,614 B2 | 8/2005 | Rackham et al. |
| 6,937,141 B2 | 8/2005 | Muramatsu |
| 6,943,669 B2 * | 9/2005 | Otterbach et al. ......... 340/12.33 |
| 6,983,200 B2 | 1/2006 | Bodin et al. |
| 6,993,421 B2 | 1/2006 | Pillar et al. |
| 7,039,508 B2 * | 5/2006 | Lin et al. .................... 701/29.6 |
| 7,040,154 B2 * | 5/2006 | Shaw et al. .................. 73/146.5 |
| 7,053,761 B2 | 5/2006 | Schofield et al. |
| 7,068,158 B2 | 6/2006 | Komatsu et al. |
| 7,092,804 B2 * | 8/2006 | McQuade et al. ........... 701/32.9 |
| 7,096,101 B2 | 8/2006 | Sonnenrein et al. |
| 7,114,379 B2 | 10/2006 | Emord |
| 7,170,400 B2 | 1/2007 | Cowelchuk et al. |
| 7,171,188 B1 | 1/2007 | Watanabe et al. |
| 7,216,532 B2 | 5/2007 | Rimkus et al. |
| 7,218,208 B2 | 5/2007 | Kikuchi |
| 7,218,209 B2 | 5/2007 | Utter et al. |
| 7,219,063 B2 | 5/2007 | Schalk et al. |
| 7,224,262 B2 | 5/2007 | Simon et al. |
| 7,228,122 B2 | 6/2007 | Oyagi et al. |
| 7,319,378 B1 | 1/2008 | Thompson et al. |
| 7,379,541 B2 | 5/2008 | Iggulden et al. |
| 7,394,352 B2 | 7/2008 | Bell et al. |
| 7,509,849 B2 | 3/2009 | Rutherford et al. |
| 7,778,186 B2 | 8/2010 | Oman et al. |
| 7,783,246 B2 | 8/2010 | Twitchell, Jr. et al. |
| 7,849,149 B2 | 12/2010 | Habaguchi et al. |
| 7,859,392 B2 | 12/2010 | McClellan et al. |
| 8,061,879 B2 | 11/2011 | Simmons et al. |
| 8,089,348 B2 | 1/2012 | Kameyama |
| 8,120,475 B2 | 2/2012 | Iwamoto et al. |
| 8,325,028 B2 | 12/2012 | Schofield et al. |
| 2001/0033225 A1 | 10/2001 | Razavi et al. |
| 2002/0130771 A1 | 9/2002 | Osborne et al. |
| 2003/0004741 A1 | 1/2003 | Johnson et al. |
| 2003/0016130 A1 | 1/2003 | Joao |
| 2003/0093218 A1 | 5/2003 | Jones |
| 2003/0145650 A1 | 8/2003 | Juzswik et al. |
| 2003/0158640 A1 | 8/2003 | Pillar et al. |
| 2003/0205081 A1 | 11/2003 | Proschka |
| 2003/0208309 A1 | 11/2003 | Triphathi |
| 2004/0050188 A1 | 3/2004 | Richards et al. |
| 2004/0075539 A1 | 4/2004 | Savoie et al. |
| 2004/0112124 A1 | 6/2004 | Sonnenrein et al. |
| 2004/0193368 A1 | 9/2004 | Sanqunetti |
| 2004/0203634 A1 | 10/2004 | Wang et al. |
| 2005/0024189 A1 | 2/2005 | Weber |
| 2005/0137763 A1 | 6/2005 | Watkins et al. |
| 2005/0179518 A1 | 8/2005 | Kawamura et al. |
| 2005/0190900 A1 | 9/2005 | White et al. |
| 2005/0195106 A1 | 9/2005 | Davis et al. |
| 2005/0242936 A1 | 11/2005 | Watabe |
| 2005/0273218 A1 | 12/2005 | Breed et al. |
| 2006/0095174 A1 | 5/2006 | Sonnenrein et al. |
| 2006/0208865 A1 | 9/2006 | Quach et al. |
| 2006/0220806 A1 | 10/2006 | Nguyen |
| 2006/0220809 A1 | 10/2006 | Stigall et al. |
| 2006/0220813 A1 * | 10/2006 | Utter et al. .................... 340/442 |
| 2006/0220814 A1 * | 10/2006 | Kawashima .................. 340/442 |
| 2006/0232391 A1 * | 10/2006 | Nakatani et al. .............. 340/447 |
| 2006/0235652 A1 | 10/2006 | Rimkus et al. |
| 2006/0250227 A1 * | 11/2006 | Naito ........................... 340/447 |
| 2006/0273885 A1 | 12/2006 | Thompson |
| 2006/0288101 A1 | 12/2006 | Mastrodonato et al. |
| 2007/0015548 A1 | 1/2007 | Flick |
| 2007/0027595 A1 | 2/2007 | Nou |
| 2007/0060056 A1 | 3/2007 | Whitaker et al. |
| 2007/0069951 A1 | 3/2007 | Sweet |
| 2007/0155300 A1 | 7/2007 | Hsieh |
| 2007/0156317 A1 | 7/2007 | Breed |
| 2007/0193348 A1 | 8/2007 | Rutherford et al. |
| 2007/0200671 A1 | 8/2007 | Kelley et al. |
| 2007/0229350 A1 | 10/2007 | Scalisi et al. |
| 2007/0290881 A1 | 12/2007 | Nikitin et al. |
| 2008/0024285 A1 | 1/2008 | Vandenbrink et al. |
| 2008/0046149 A1 | 2/2008 | Breed |
| 2008/0077292 A1 | 3/2008 | Gisler |
| 2008/0082221 A1 | 4/2008 | Nagy |
| 2008/0106859 A1 | 5/2008 | Eguchi et al. |
| 2008/0125665 A1 | 5/2008 | Nigam |
| 2008/0136611 A1 | 6/2008 | Benco et al. |
| 2008/0140265 A1 | 6/2008 | Hong et al. |
| 2008/0147265 A1 | 6/2008 | Breed |
| 2008/0147271 A1 | 6/2008 | Breed |
| 2008/0172147 A1 | 7/2008 | Taki et al. |
| 2008/0197970 A1 | 8/2008 | Fouts |
| 2008/0204556 A1 | 8/2008 | de Miranda et al. |
| 2008/0215665 A1 | 9/2008 | Appleby et al. |
| 2008/0228355 A1 | 9/2008 | de Jonk et al. |
| 2008/0266051 A1 | 10/2008 | Taki et al. |
| 2008/0299961 A1 | 12/2008 | Muller et al. |
| 2008/0309451 A1 | 12/2008 | Zellweger et al. |
| 2009/0075624 A1 | 3/2009 | Cox et al. |
| 2009/0091437 A1 * | 4/2009 | Corniot ........................ 340/442 |
| 2009/0096575 A1 | 4/2009 | Tieman |
| 2009/0096576 A1 | 4/2009 | Oman et al. |
| 2009/0096596 A1 | 4/2009 | Sultan et al. |
| 2009/0098907 A1 | 4/2009 | Huntzicker et al. |
| 2009/0102633 A1 * | 4/2009 | Ebinuma et al. ............. 340/442 |
| 2009/0167524 A1 | 7/2009 | Chesnutt et al. |
| 2009/0273438 A1 | 11/2009 | Sultan et al. |
| 2010/0145759 A1 | 6/2010 | Hembury |
| 2010/0168967 A1 | 7/2010 | Dlugoss et al. |
| 2010/0233957 A1 | 9/2010 | Dobosz |
| 2011/0015971 A1 | 1/2011 | Hembury |
| 2011/0029875 A1 | 2/2011 | Milch |
| 2011/0071720 A1 | 3/2011 | Schondorf et al. |
| 2011/0071725 A1 | 3/2011 | Kleve et al. |

(56) References Cited

U.S. PATENT DOCUMENTS

| | | |
|---|---|---|
| 2011/0071734 A1 | 3/2011 | Van Wiemeersch et al. |
| 2011/0080282 A1 | 4/2011 | Kleve et al. |
| 2011/0130945 A1 | 6/2011 | Deedy et al. |
| 2011/0205040 A1 | 8/2011 | Van Wiemeersch et al. |
| 2011/0205047 A1 | 8/2011 | Patel et al. |
| 2011/0215901 A1 | 9/2011 | Van Wiemeersch et al. |
| 2011/0230165 A1 | 9/2011 | Kleve et al. |

FOREIGN PATENT DOCUMENTS

| | | |
|---|---|---|
| EP | 1609629 A1 | 12/2005 |
| WO | 2006075533 | 7/2006 |

OTHER PUBLICATIONS

Chinese Patent Office, Office Action for the corresponding Chinese patent application No. 201110039418.X mailed Feb. 13, 2015.

\* cited by examiner

Data = Frame 1 = Frame 2 = Frame 3 = Frame 4

| Pre-Amble | ID | Pressure | Temperature/ BMT Counter Value | Status | Check - Sum |
|---|---|---|---|---|---|
| 16 bits | 32 bits | 8 bits | 8 bits | 8 bits | 8 bits |
| 200 | 202 | 204 | 206 | 208 | 210 |

*Fig-2A*

| Low Battery | Rotating/ Stationary Mode | Pressure Range | RPC Transmission |
|---|---|---|---|
| 1 bit | 1 bit | 1 bit | 5 bits |
| 208a | 208b | 208c | 208d |

*Fig-2B*

Function Code: RPC

| 0 | 0 | 1 | 0 | 1 |
|---|---|---|---|---|

*Fig-2C*

METHODS AND SYSTEMS FOR DETERMINING A TIRE PRESSURE STATUS

CROSS-REFERENCE TO RELATED APPLICATIONS

This application is a continuation of U.S. application Ser. No. 12/712,669, filed Feb. 25, 2010, the disclosure of which is incorporated in its entirety by reference herein.

TECHNICAL FIELD

Various embodiments include methods and systems for determining a tire pressure status. Further embodiments include methods and systems for determining a rate of inflation or deflation of one or more vehicle tires.

BACKGROUND

Various examples exist in the field for determining a tire pressure status. For instance, U.S. Pat. No. 6,441,732 issued to Laitsaari et al. discloses a system for displaying tire characteristics. A vehicle depot such as for example a gas station, a bus stop or a truck terminal, is equipped with a communications system to receive data from a vehicle that represents the operational characteristics of the tires of the vehicle. The information may be automatically transmitted to an appropriate transceiver located at the gas station when the vehicle enters a preset perimeter of, or is a given distance from, the gas station. Thus, when the operator of the vehicle begins to pump gas or input air to the tires of his vehicle, he could readily view the operational characteristics, or the status, of the tires of his vehicle at a display that is mounted either at the gas pump, the handle of the gas hose, the housing of the air supply or some other convenient location at the gas station. In addition, the attendant at the gas station can view the operational characteristics of the tires of any of the vehicles parked at the gas station so that, if tire abnormalities are observed, the attendant could inform the operator of the vehicle that has the abnormal tire(s) that there is a potential problem. A permanent record of the operational characteristics of the tires of any of the vehicles may be printed out. Displays may also be incorporated to roadside signs/billboards so that passing motorists may readily ascertain from the displays the operational characteristics of the tires of their vehicles. Simple alert messages that apprize the motorists, either at the vehicle depot or passing the roadside sign/billboard displays, of whether attention needs to be directed to the tires of their vehicles may be displayed in place of the actual tire operational characteristics.

U.S. Pat. No. 6,612,165 issued to Juzswik et al. discloses a tire pressure monitoring system with pressure gauge operating mode for indicating when air pressure within a tire is within a predetermined pressure range. A tire inflation pressure monitoring system and a method for monitoring air pressure within a tire are provided. The system includes a tire based unit for sensing air pressure within the tire and for transmitting a pressure signal indicative thereof. The system also includes a vehicle based unit for receiving the pressure signal and for comparing the pressure signal to a predefined pressure range. The vehicle based unit is operable in one of (i) a normal operating mode that outputs an alert signal in response to the air pressure within the tire being outside of the predefined pressure range and (ii) a pressure gauge operating mode that outputs an in-range signal in response to the air pressure within the tire being within the predetermined pressure range.

SUMMARY

One aspect may include a tire pressure status notification system for a vehicle. The tire pressure status notification system may include at least one computer which may be configured to receive input defining an inflation status of one or more vehicle tires and receive tire inflation data of the one or more tires. The at least one computer may be also configured to calculate a specific value associated with an inflation event of the one or more vehicle tires based on the inflation data.

The specific value may be a numeric pressure value of the one or more vehicle tires measured in a unit of pressure. The specific value may also be an inflation rate.

The specific numeric pressure value may be a pressure value of the one or more tires measured at one or more instances during the inflation event. The numeric pressure values may additionally or alternatively be a difference between a stored placard pressure value (which may be input by a user) and a pressure value of the one or more tires measured at one or more instances during the inflation event.

The specific inflation rate value may be measured in a unit of time.

The at least one computer may be further configured to generate one or more messages for outputting the specific value from one or more vehicle components (e.g., and without limitation, one or more vehicle lights, a vehicle horn, a vehicle audio system, or a voice-based vehicle computing system) and to transmit the one or more messages to the one or more vehicle components. The specific value may be output as one or more messages from the vehicle. The messages may be audible and may include, but are not limited to, one or more beeps, tones, horn honks, or one or more voice-based messages.

Another aspect may include a method for tire pressure status notification from a vehicle. The method may include receiving input defining an inflation status of one or more vehicle tires and receiving tire inflation data of the one or more tires. The status input and the inflation data may be received via one or more data packets transmitted from one or more tire pressure monitoring sensors. In one embodiment, the status input and the inflation data may be received in response to a triggering event (e.g., and without limitation, an air mass change of one or more tires). In a further embodiment, the status input and the inflation data may be received periodically after the triggering event (e.g., and without limitation, every 15 to 30 seconds).

The method may further include calculating a specific value associated with an inflation event of the one or more vehicle tires based on the inflation data. One or more messages for outputting the specific value from one or more vehicle components may be generated and transmitted to the one or more vehicle components. In one embodiment, the one or more vehicle components may be selected based on a user preference. The specific value may be output as one or more messages from the vehicle.

In one embodiment, the method may include periodically sampling a pressure value of the one or more tires. This sampled pressure value may be included in the tire inflation data. Further, the pressure value may be sampled according to a sampling mode.

In another embodiment, the tire inflation data may include at least one of a placard pressure value and a duration of inflation of the one or more tires.

Another aspect may include a method which includes receiving input defining an inflation status of one or more vehicle tires and receiving inflation data for the vehicle tires.

The method may also include calculating a specific value for an inflation event based on the inflation data. The specific value may be output as one or more messages to one or more vehicle components.

These and other aspects of the present invention will be better understood in view of the attached drawings and following detailed description of the invention.

BRIEF DESCRIPTION OF THE DRAWINGS

The figures identified below are illustrative of some embodiments of the present invention. The figures are not intended to be limiting of the invention recited in the appended claims. Embodiments of the present invention, both as to their organization and manner of operation, together with further objects and advantages thereof, may best be understood with reference to the following description, taken in connection with the accompanying drawings, in which:

FIG. 2a illustrates a data packet message format for transmitting one or more messages from one or more tire pressure monitoring system sensors according to one of the various embodiments;

FIG. 2b illustrates a data packet message format for transmitting a tire pressure status message from one or more tire pressure monitoring system sensors according to one of the various embodiments;

FIG. 2c illustrates a non-limiting example of a function code transmitted in the data packet of FIG. 2b;

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
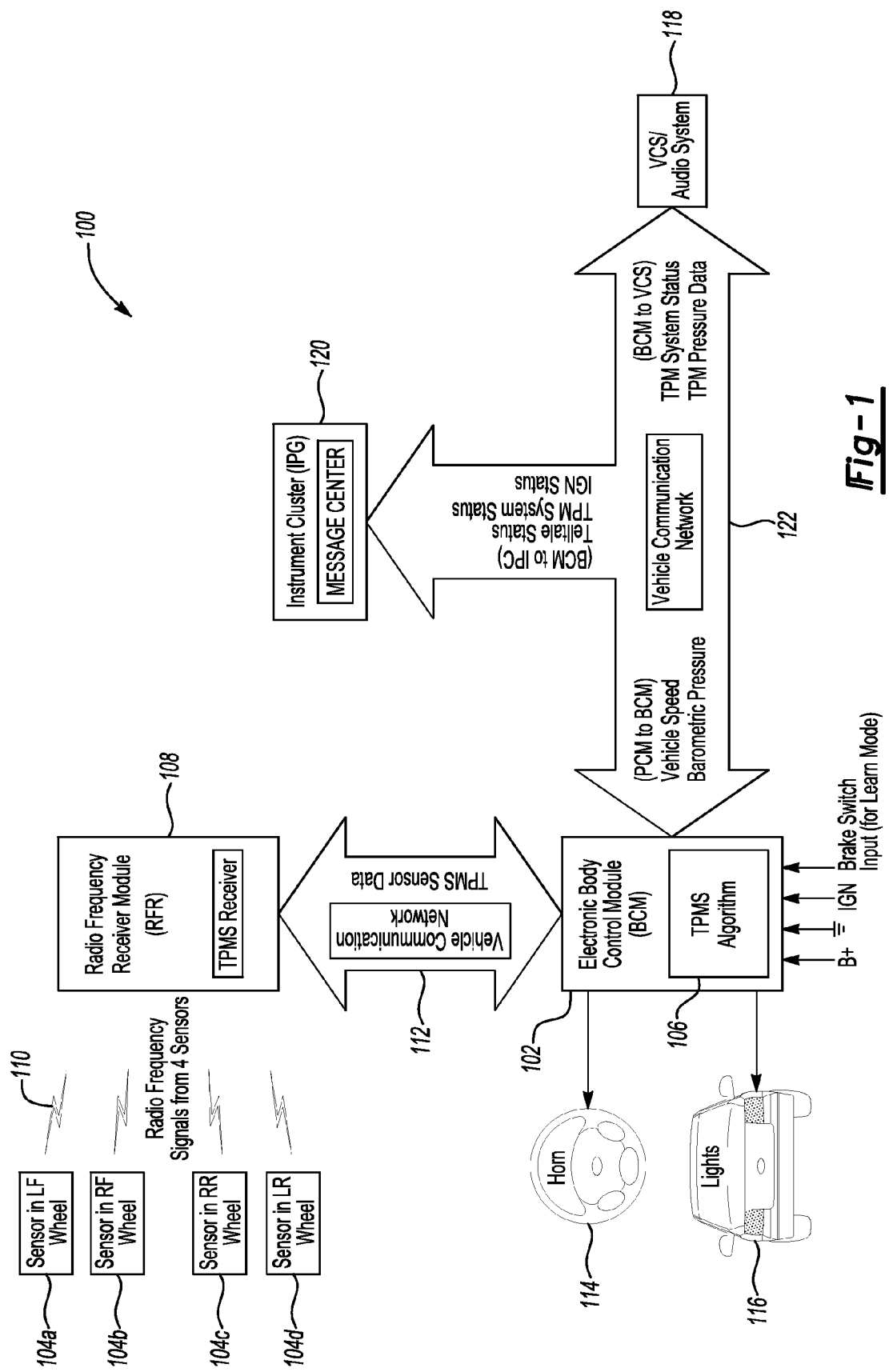
FIG. 1 illustrates a tire pressure monitoring system according to one of the various embodiments.

FIG. 1 shows a non-limiting exemplary embodiment of a tire pressure monitoring system (TPMS) of a vehicle. One or more tire sensors 104a-d may be disposed in one or more vehicle tires. For example, tire sensor 104a may be disposed in the left, front wheel, tire sensor 104b may be disposed in the right, front wheel, tire sensor 104c may be disposed in the right, rear wheel, and tire sensor 104d may be disposed in the left, rear wheel.

Tire sensors 104a-d may be installed onto one or more wheels as part of the TPMS in order to detect the pressure status of one or more vehicle tires. Furthermore, tire sensors 104a-d may periodically monitor or sample tire pressure for making a pressure determination. For example, tire sensors 104a-d may monitor tire pressure every 15 minutes. The periods at which the sensors 104a-d may monitor the tire pressure may vary depending on the preferences of the vehicle manufacturer.

Tire sensor(s) 104a-d may have different modes for monitoring tire pressure. Non-limiting examples of tire sensor modes include a rotating mode (i.e., wheels are moving), a stationary mode (i.e., wheels have been stationary for an extended period of time, e.g., greater than 15 minutes), and an interim mode (i.e., a predetermined time (e.g., 15 minutes) between a tire pressure event (including, but not limited to, wheel motion) and the stationary mode). The monitoring periods may also vary depending on the mode in which the tire sensors 104a-d are operating. For example, in a rotating mode, tire sensors 104a-d may monitor tire pressure every 5 seconds. In stationary mode, tire sensors 104a-d may monitor tire pressure less frequently (e.g., every minute). In the interim mode, the sensors 104a-d may monitor tire pressure every 2 seconds. The mode in which the tires are operating may be based on signal(s) transmitted from a motion sensor(s) communicating with tire pressure sensor(s) 104a-d indicating a movement status of the tires. Furthermore, one or more timers may be installed in sensor(s) 104a-d for measuring the span of the interim period.

During a tire pressure event (i.e., an event effecting tire pressure including, but limited to, an inflation event or deflation event), tire sensors 104a-d may enter a rapid pressure change mode (RPC). In RPC mode, sensors 104a-d may transmit the monitored tire pressure data obtained from the one or more tires. Transmission rates may vary depending on vehicle manufacturer preferences. In one non-limiting embodiment, the tire pressure data may be transmitted in the range of every 15 to 30 seconds.

The tire pressure data may be transmitted to a TPMS receiver 108 for transmission to the vehicle body control module (BCM) 102. The TPMS receiver 108 may be a radio frequency receiver module installed in the vehicle. Accordingly, in one non-limiting embodiment, the tire pressure data from the sensor 104a-d may be transmitted as radio frequency signals 110 to the TPMS receiver 108.

TPMS receiver 108 may be in communication with the BCM 102 over a vehicle communication network 112 which may include, without limitation, CAN, J-1850, GMLAN. The vehicle communication network 112 may facilitate unilateral and/or bilateral data exchange (e.g., data from and/or to sensor(s) 104a-d) between the TPMS receiver 108 and BCM 102. It should be understood that the architecture is non-limiting and may be modified and/or re-arranged without departing from the scope of the various embodiments. By way of example and not limitation, TPMS receiver 108 may be a component of BCM 102 rather than as a separate component as illustrated in FIG. 1.

The body control module (BCM) 102 may be disposed in the vehicle and may receive tire inflation status data from tire pressure sensor(s) 104a-d. BCM 102 may include programmable instructions (or an algorithm) 106 for determining tire inflation/deflation status. For example, as will be described below, TPMS algorithm 106 may determine a tire pressure level measured in pound-force per square inch (psi), kiloPascal (kPa), bars, or other pressure units. As another non-limiting example, TPMS algorithm 106 may measure the rate of inflation/deflation which may be measured in, as a non-limiting example, units of time (e.g., seconds). It should be understood that the units of measurement used in these examples are non-limiting and other units may be utilized without departing from the scope of the various embodiments.

BCM 102 may transmit the tire inflation/deflation status to one or more components of the vehicle for transmitting a status message to a user. A non-limiting example of a user is any individual inflating/deflating the vehicle's tires such as a vehicle owner, user, or service technician. Non-limiting examples of vehicle components to which one or more inflation/deflation status messages may be transmitted include a vehicle horn 114, vehicle lights (exterior or interior) 116, a vehicle computing system 118, a vehicle audio system 118, the vehicle instrument cluster 120, or combinations thereof.

In one embodiment, the status message(s) may be transmitted to and displayed on a user's nomadic device (not shown) via a wireless connection with the vehicle computing system 118. A nomadic device may include, but is not limited to, a mobile phone, PDA, smartphone, or any other wireless device. The wireless connection may be, without limitation, BLUETOOTH, WiFi, or WiMax.

The messages to the one or more vehicle components may be transmitted over a vehicle communication network 122 which may include, without limitation, CAN, J-1850, GMLAN. It should be understood that the arrangement of FIG. 1 is non-limiting and may be modified without departing from the scope of the various embodiments. As a non-limiting example, vehicle may include one or more vehicle communication networks such that vehicle communication networks 112 and 122 may be the same networks or different networks. Vehicle communication network 112 and 122 may also be of the same or different speeds (e.g., and without limitation, network 112 may be a medium speed network and network 122 may be a high speed network or both networks 112 and 122 may be high speed networks).

Status messages received by the BCM 102 from the sensor(s) 104*a-d* may be transmitted as one or more data packets according to one or more message protocols. In one embodiment, data may be defined by at least four data packets (or frames). FIGS. 2*a* and 2*b* illustrate exemplary embodiments of the data packets and the associated protocols that define the tire inflation/deflation status messages.

FIG. 2*a* illustrates a general structure of the data packet and the message protocol transmitted from the sensor(s) 104*a-d*. The preamble field 200 may include bits of data (e.g., 8 bits) for initializing the data transmission. The ID field 202 may include identification information of the data packet. The identification information may include a destination address and a source address. The pressure field 204 may include updated tire pressure value(s). For example, the information may include the tire pressure value from the last inflation event. In one embodiment, this information may be updated at predetermined intervals (e.g., and without limitation every 15-30 seconds). Temperature field 206 may include tire air temperature information. Status field 208 may include sensor status data including, but not limited to, one or more functions transmitted from the sensor 104*a-d*. Checksum field 210 may be a verification field to verify the bits of data transmitted in the packet frame.

FIG. 2*b* illustrates the composition of the status field in further detail. The status field may comprise 8 bits of information transmitted in the data packet. In one embodiment, the first three bits may be reserved to provide specific information. For example, and without limitation, the first three bits may comprise a battery status 208*a*, a mode status 208*b*, and pressure sensor range 208*c*.

Battery status 208*a* may indicate the life of the sensor's battery. In one embodiment, battery status 208*a* may be a low battery status message. Mode status 208*b* may indicate the mode in which the sensor(s) 104*a-d* is operating (as described above). The pressure sensor range 208*c* comprises the range at which the sensor obtains pressure information relative to the atmosphere. In one embodiment, the pressure range may be a numeric value (e.g., measured in "psig"). In another embodiment, the range may be a general range (e.g., a "low/high" range).

The remaining five bits of the 8 bit status field may be comprised of one or more function codes. A non-limiting example of a function code is an RPC transmission function code. When the sensor(s) 104*a-d* are transmitting tire inflation/deflation data in RPC mode, the status field of the data packet(s) will include the "RPC transmission" function code for identifying a rapid pressure change. A non-limiting example of a RPC function code is provided in FIG. 2*c*.

For example, if the tires are being inflated, the function code will include data representing tire inflation. Tire inflation may be determined by a change in measured pressure data by a predetermined amount (e.g., and without limitation, 2 psi). In one embodiment, the sensor(s) 104*a-d* may measure the change in pressure and transmit a pressure increase confirmation (PIC) signal based on the pressure change. Conversely, if the tires are being deflated, the function code may include data representing tire deflation. In one embodiment, the sensor(s) 104*a-d* may measure the change in pressure and transmit a pressure decrease confirmation (PDC) signal based on the pressure change.

The TPMS system 100, as disclosed in the various embodiments, may offer useful information to a user by transmitting pressure status information through one or more vehicle components. Non-limiting examples of information to a user may include pressure values and/or a rate of inflation/deflation during an inflation/deflation event. The messages transmitted from the TPMS system 100 may be received by a user as individual status messages or as a combination of messages.

NON-LIMITING EXAMPLE 1

Pressure Values

Figure 3:
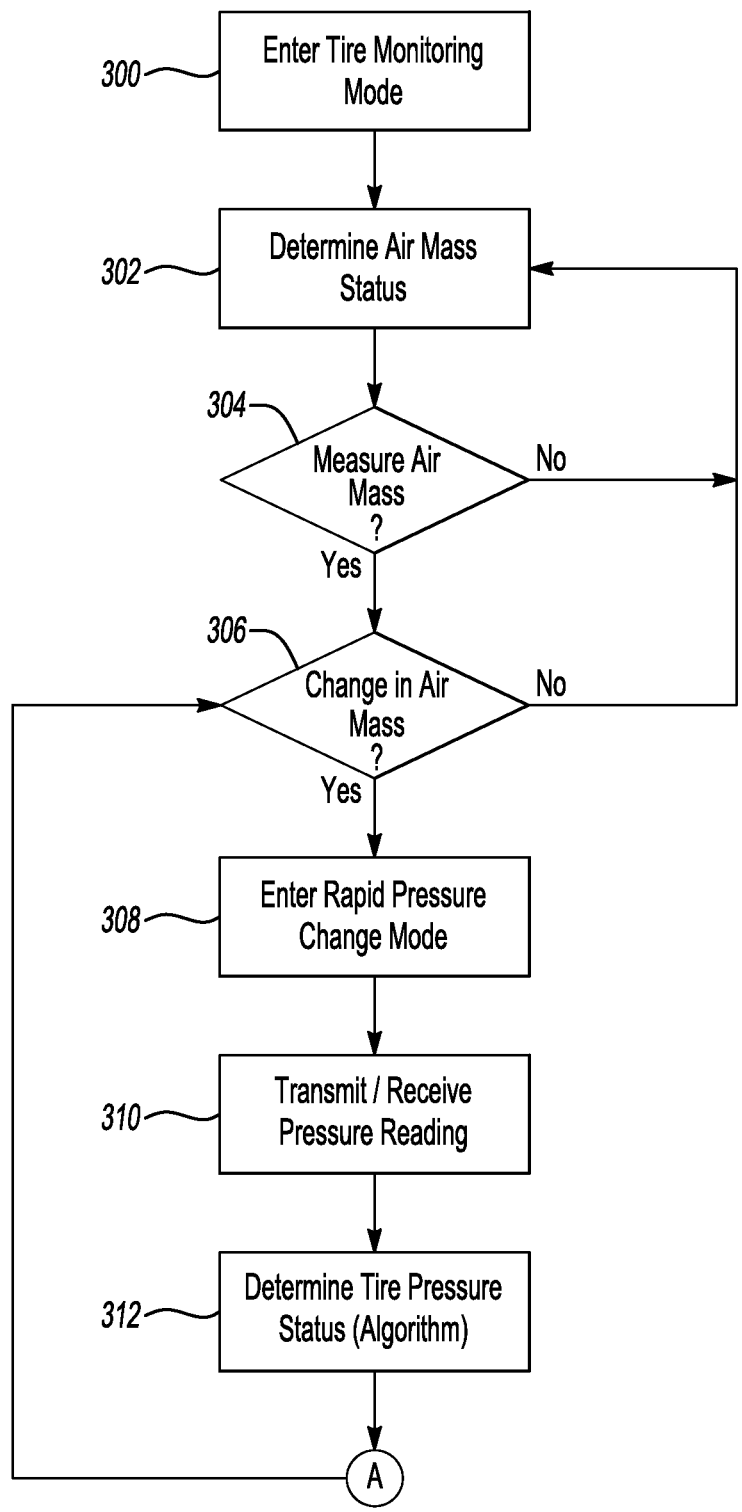
FIG. 3 illustrates an exemplary operation for determining a pressure in one or more tires according to one of the various embodiments.

FIG. 3 illustrates an exemplary operation of determining and transmitting pressure values for receipt by the user at a vehicle. As illustrated in block 300, the sensor(s) 104*a-d* may enter a tire monitoring mode based on the motion detected by the motion sensors. Non-limiting examples of monitoring modes are described above.

As illustrated in block 302, sensor(s) 104*a-d* may determine the air mass status of one or more tires by, for example, monitoring (or sampling) the air mass. In one embodiment, monitoring the air mass may be performed at predetermined time intervals. Thus, as illustrated in block 304, a determination may be made whether the time for measuring the air mass has lapsed. For example, and without limitation, in the interim mode, air mass monitoring may occur every 2 seconds. As another non-limiting example, in the stationary mode, the air mass monitoring may occur every minute. Depending on the mode in which the sensor(s) 104*a-d* is operating, if the time for air mass monitoring has not lapsed, then sensor(s) 104*a-d* may stall an air mass measurement.

If the predetermined time has lapsed, a further determination may be made as to whether a change in the tire's air mass has occurred as illustrated in block 306. If a change has not occurred, sensor(s) 104*a-d* may return to monitoring the air mass status at predetermined intervals. If a mass change has occurred, the sensor(s) 104*a-d* may enter the RPC mode as illustrated in block 308. As described above, the air mass change may be a trigger for the RPC mode.

Sensor 104a-d may identify the change in air mass as an inflation or deflation event based on the increase or decrease in air mass, respectively. Upon entering the RPC mode, sensor 104a-d may transmit the pressure reading(s) (e.g., the PIC or PDC) to the BCM 102 as illustrated in block 310. As described above, the PIC or PDC may include the pressure value(s) of the tire(s) based on the increase or decrease in air mass, respectively. This information may be transmitted to the BCM 102 at predetermined time intervals (e.g., and without limitation, every 15-30 seconds for an increase or every 2 seconds for a decrease).

As illustrated in block 312, upon receipt of the tire inflation status signals, the BCM 102 may determine the pressure value of the inflated tire(s) based on the algorithm 106 programmed to and performed at the BCM 102. In one embodiment, the algorithm 106 may include instructions for transmitting the pressure value to the user via one or more vehicle components. Thus, one or more commands may be transmitted to the one or more vehicle components for outputting the pressure value. The message output operation is represented by circle block A in FIG. 3 and continued in FIG. 5 (further described below).

In one embodiment, the user may receive multiple pressure status values. In this embodiment, the user may, for example, initiate an inflation event and temporarily stall the inflation event to obtain an initial pressure value status message. Thus, after adding one or more blasts of air, the user may discontinue inflation and wait for a message to be output from one or more vehicle components to determine an initial pressure value. The user may continue the inflation event (with or without inflation event pauses) to obtain one or more additional pressure values until the desired pressure value is reached as determined by the output message.

Alternatively or additionally, the user may continuously inflate the one or more tires while receiving one or more pressure value messages output from the vehicle. The user may discontinue further inflation when the desired pressure value has been reached as determined by the output message.

NON-LIMITING EXAMPLE 2

Rate of Inflation

Figure 4:
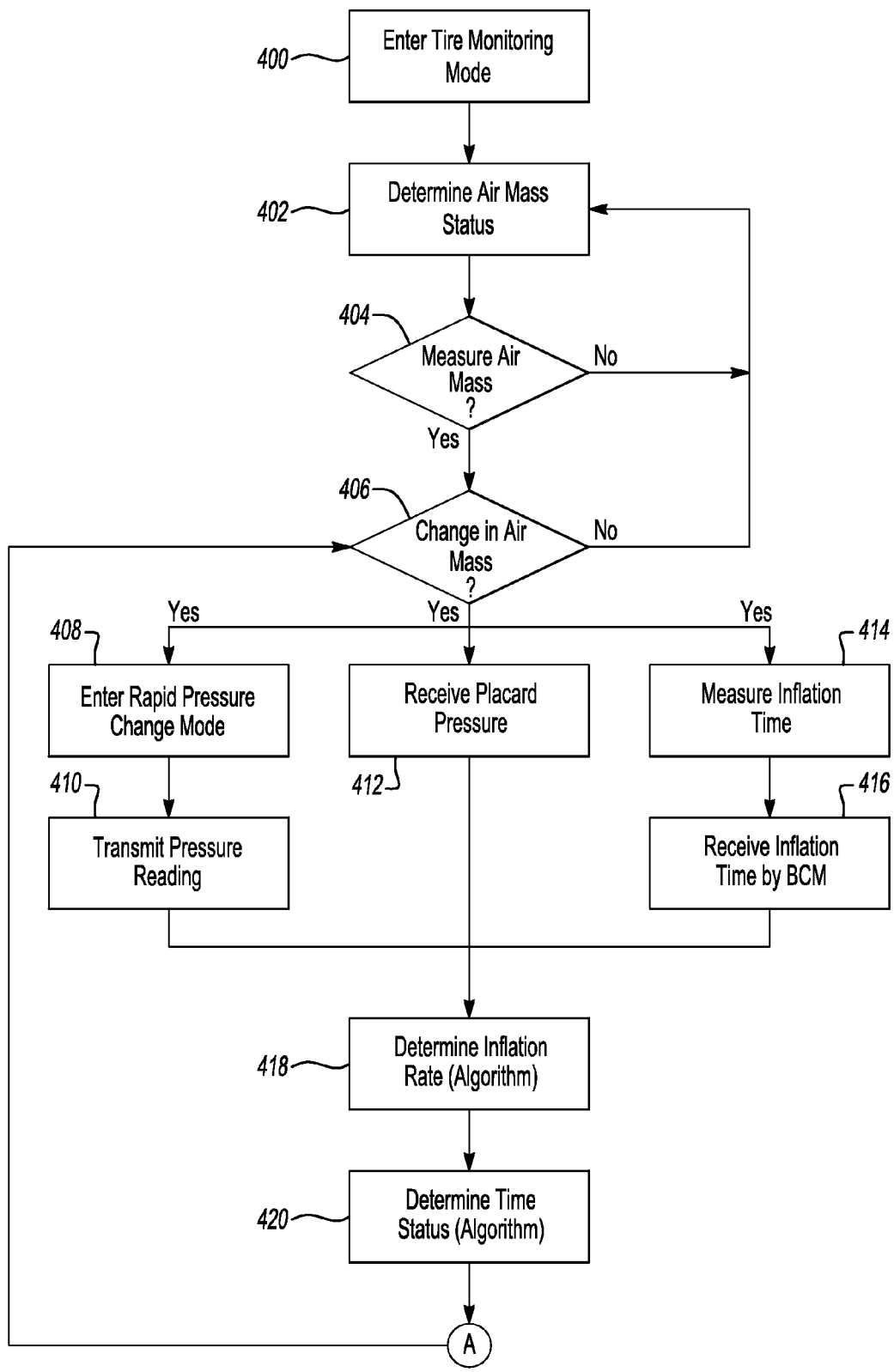
FIG. 4 illustrates an exemplary operation for determining the rate of inflation/deflation for one or more tires according to one of the various embodiments.

FIG. 4 illustrates a non-limiting operation of determining a rate of inflation/deflation during one or more tire inflation/deflation events. As illustrated in block 400, the sensor(s) 104a-d may enter a tire monitoring mode. As illustrated in block 402, an air mass status may be determined by monitoring or sampling the air mass.

The frequency of the air mass sampling may depend on the monitoring mode. The sensor(s) 104a-d may determine whether to sample the air mass of one or more tires based on the lapse of a predetermined time interval, as illustrated in block 404, associated with each monitoring mode. As described above, depending on the mode in which the sensor(s) 104a-d is operating, if the time for air mass monitoring has not lapsed, then sensor(s) 104a-d may stall an air mass determination.

If the predetermined time has lapsed, a further determination may be made as to whether a change in the tire's air mass has occurred as illustrated in block 406. If a change has not occurred, sensor(s) 104a-d may return to monitoring the air mass status at predetermined time intervals. If a mass change has occurred, the sensor(s) 104a-d may enter the RPC mode as illustrated in block 408. As described above, the air mass change may be a trigger for the RPC mode. Upon entering the RPC mode, sensor 104a-d may transmit the pressure reading(s) (e.g., the PIC or PDC) to the BCM 102 as illustrated in block 410.

As illustrated in block 412, a placard pressure stored in a vehicle computing system (not shown) may also be received at the BCM 102. The placard pressure is generally a recommended tire pressure level for operating a vehicle. Accordingly, the placard pressure may be utilized by the system 100 to notify the user of the rate of inflation/deflation until the placard pressure is reached.

The placard pressure may or may not be stored in the vehicle computing system by an OEM at factory installation. In one embodiment, a user (e.g., a vehicle owner or vehicle user) may input one or more desired placard pressures depending on the condition(s) in which the vehicle is driven. As one non-limiting example, the placard pressure may be changed based on vehicle speed (e.g., and without limitation, the driver wishes to drive at high speeds). As another non-limiting example, the placard pressure may be changed based on the vehicle load (e.g., and without limitation, due to the number of passengers or the weight of equipment in the vehicle). The updated placard pressure may then be used when notifying a user of a tire pressure status during an inflation/deflation event. Further details of the notification process are described below.

As illustrated in block 414, the inflation/deflation time of the tire(s) may be measured. During an RPC event, one or more timestamps may be associated with each change in pressure that is sampled (e.g., and without limitation, every two seconds in interim mode). Sensor(s) 104a-d may calculate the rate of inflation/deflation based on a change in pressure values between sampling instances. For example, if the sensor(s) 104a-d are in a stationary mode that samples pressure every 30 seconds, and 30 seconds have lapsed since a user began the inflation event, the sensor(s) 104a-d may measure the pressure value change with respect to the placard pressure and the pressure of the tire at or around 30 seconds.

In one embodiment, the result may be output once the sampling has been made (i.e., at 30 seconds). When the user recommences inflation, the pressure value change may be measured again based on the pressure value of the last inflation event. It will be appreciated that the time values are exemplary and other values may or may not be utilized without departing from the scope of the various embodiments.

In another embodiment, transmission of the rate of inflation/deflation may be delayed. For example, if pressure status transmission occurs every 60 seconds (in an RPC mode), the sensor 104a-d may gather air mass information 2 times and calculate the rate of inflation based on the air mass changes that have occurred prior to the transmission. It will be appreciated that the time values are exemplary and other values may or may not be utilized without departing from the scope of the various embodiments.

It should be understood that the same analysis may be performed during a deflation event. Furthermore, it should be understood that inflation/deflation may occur continuously (i.e., without a pause or interruption by the user) until the desired pressure level has been reached.

The inflation/deflation data may be received by the BCM 102 as illustrated in block 416.

The information received from the sensor(s) 104a-d and transmitted to the BCM 102 may be input to the TPMS algorithm 106. The rate of inflation may be determined as illustrated in block 418. The rate of inflation may be measured in units of time (e.g., and without limitation, seconds). As illustrated in block 420, from the rate of inflation, the time until the placard pressure is reached (for example) is determined.

In one embodiment, the algorithm 106 may include instructions for transmitting the rate of inflation and/or time status to the user via one or more vehicle components. Thus, one or more commands may be transmitted to the one or more vehicle components for outputting the rate of inflation. The message output operation is represented by circle block A in FIG. 4 and continued at FIG. 5 (further described below).

Figure 5:
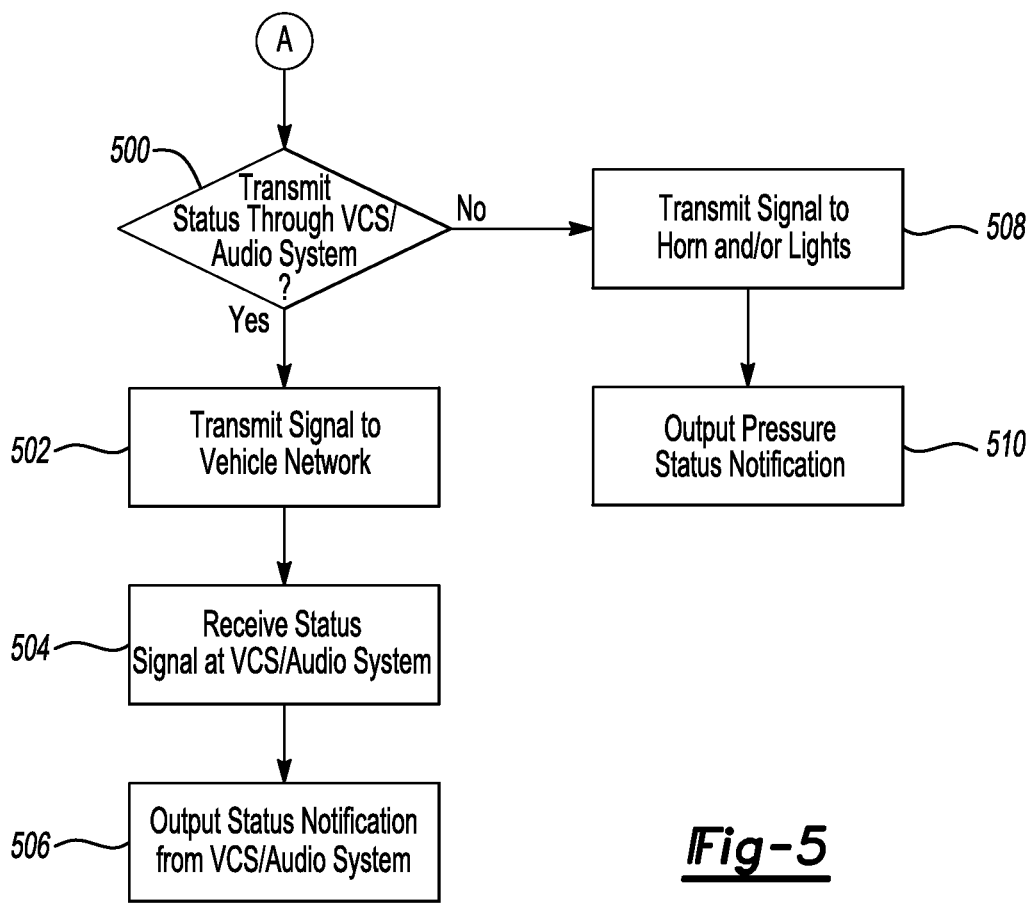
FIG. 5 illustrates an exemplary operation of the tire pressure monitoring system for outputting a tire pressure status message according to one of the various embodiments.

FIG. 5 illustrates the operation for outputting an inflation/deflation status message to the user after the status has been determined (as described above with respect to FIGS. 3 and 4). A determination may be made at the BCM 102 as to from which component the status message should be output as illustrated in block 500. In one embodiment, the BCM 102 may be default to output the status message through a vehicle computing system (not shown) and/or the vehicle audio system. A non-limiting example of a vehicle computing system is the SYNC system manufactured and distributed by the FORD MOTOR COMPANY.

The decision to output a status message from the vehicle computing system or another component may be based on a user preference stored at the vehicle computing system. The user may input this preference from the vehicle computing system and/or from a website. If the preferences are input from a website, the information may be transmitted to the vehicle over any wireless network (e.g., and without limitation, WiFi, WiMax or cellular). A non-limiting example of such a website is www.syncmyride.com.

If the status message(s) are transmitted through the vehicle computing system, the BCM 102 may transmit a command signal to the vehicle computing network 122, as illustrated in block 502, for transmission to the vehicle computing system. The vehicle computing system may receive the command as illustrated in block 504. The vehicle computing system may then output the status message(s) from one or more vehicle speakers as illustrated in block 506.

The status message(s) may be output as audible messages. Non-limiting example of audible messages include tones, beeps, speech, or combinations thereof. For example, if a tire pressure value is at 32 psi, a message output as a tone or beep may be heard as "beep-beep-beep (pause) beep-beep." Alternatively or additionally, the vehicle computing system may output "32 psi" in a spoken language. It should be understood that the vehicle computing system may output the status message in any language.

As another non-limiting example, if the inflation time status is determined to be 5 seconds, one output may be "beep-beep-beep-beep-beep." Another non-limiting output may be "5 seconds" output in a spoken language from the voice computing system.

If the status message(s) are not transmitted through the vehicle computing system and/or audio system, the status message(s) may be transmitted through other vehicle components (e.g., and without limitation, the vehicle horn or the vehicle lights). In this instance, the BCM 102 may transmit one or more commands to the vehicle horn and/or vehicle light(s) as illustrated in block 508. The status message(s) may be output from the vehicle horn and/or light(s) as illustrated in block 510.

Using the examples above to illustrate this embodiment, if the placard pressure is 32 psi, the vehicle horn may output "beep-beep-beep (pause) beep-beep." If there are 5 seconds left until the placard pressure is reached, the horn may beep 5 times. Alternatively or additionally, the interior or exterior lights may flash as follows to represent 32 psi: flash 3 times, pause, flash 2 times. To represent that 5 seconds are left until the placard pressure is reached, the lights may flash 5 times.

Figure 6:
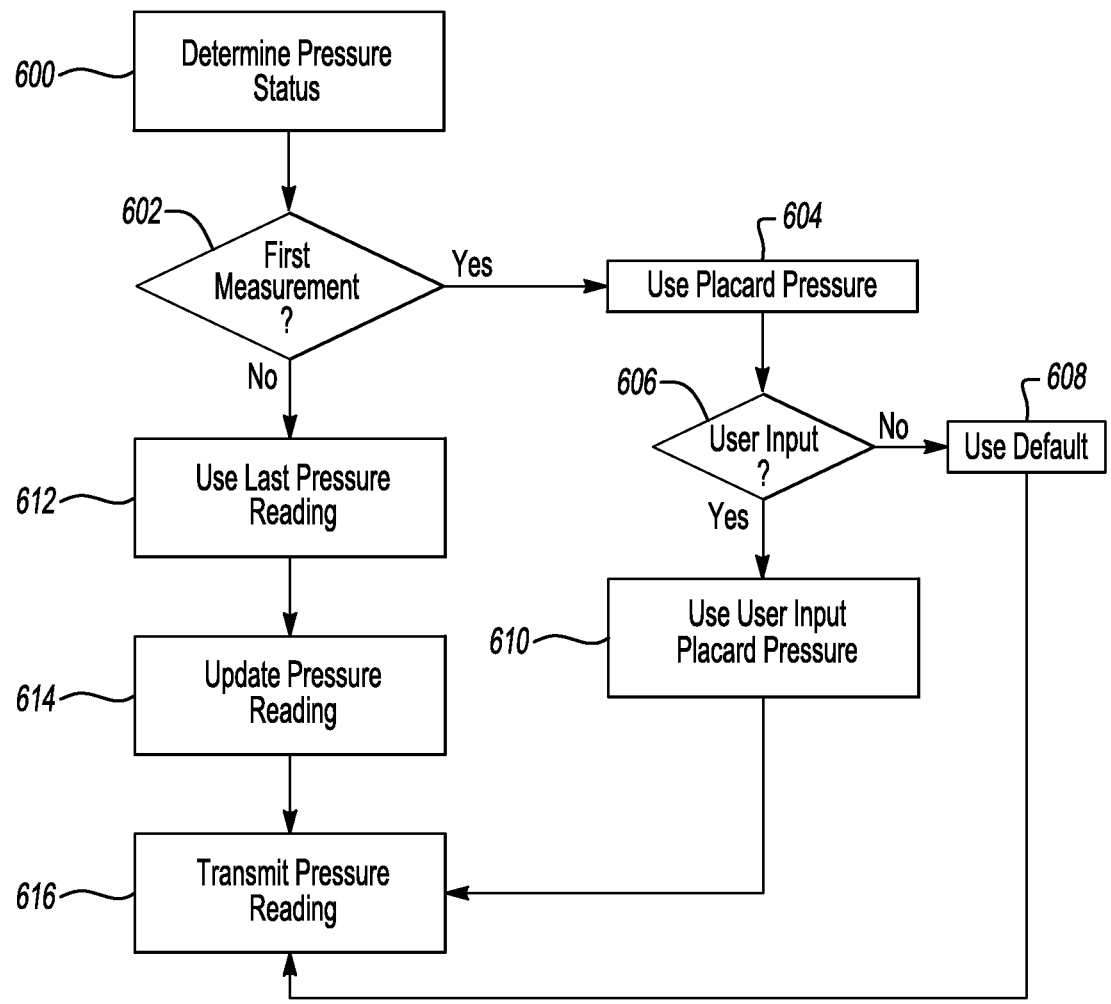
FIG. 6 illustrates an exemplary operation of a rapid pressure change mode of a tire pressure monitoring system according to one of the various embodiments.

FIG. 6 further illustrates the RPC mode described above. The RPC mode may be triggered upon detection by the sensor(s) 104a-d of a change in pressure value. The change in pressure value may be based on the placard pressure. For example, a change of 2 psi from the placard pressure may trigger activation of the RPC mode. Alternatively or additionally, the change in pressure value may be based on the last pressure reading (as determined by the pressure value field 204).

As illustrated in block 600, sensor 104a-d may determine a pressure status. The pressure status that is used may be determined based on the commencement of the inflation/deflation event as illustrated in block 602.

If the sensor(s) 104a-d are determining the tire pressure status for the first time in the tire inflation/deflation session, the sensor(s) 104a-d may used the placard pressure for determining a pressure value change as illustrated in block 604. A determination may be made whether the placard pressure has been input by a user as illustrated in block 606.

If not, a default may be used (e.g., as input by the OEM) as illustrated in block 608. If a placard pressure has been received from a user, the user input placard pressure may be utilized as illustrated in block 610.

If the tire pressure status is not being determined for the first time, the sensor(s) 104a-d may use the pressure value from the last pressure reading to determine the pressure value change as illustrated in block 612. If a change in pressure value has occurred, the sensor(s) 104a-d may update the pressure reading as illustrated in block 614.

As illustrated in block 616, the updated pressure reading or the placard pressure may be transmitted in pressure field 204 (FIG. 2) to the TPMS receiver 108 for transmission to the BCM 102.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A computer-implemented method for tire pressure status notification from a vehicle, the method comprising:
   receiving tire inflation data of one or more tires comprising tire pressure, tire air temperature and sensor status data;
   calculating a specific value associated with an inflation event of the one or more tires based on the tire inflation data compared to a stored placard pressure value defined by input received from a vehicle user that comprises a desired tire pressure in response to at least one of vehicle speed and load; and
   outputting a message for the specific value to one or more vehicle components.

2. The method of claim 1 further comprising periodically sampling a pressure value of the one or more tires, wherein the tire inflation data includes a sampled pressure value.

3. The method of claim 2 wherein the tire inflation data further includes a duration of inflation of the one or more tires.

4. The method of claim 2 further comprising periodically sampling the pressure value of the one or more tires according to a sampling mode.

5. The method of claim 1 wherein the tire inflation data is received via one or more data packets transmitted from one or more tire pressure monitoring sensors.

6. The method of claim 1 wherein the tire inflation data is received in response to a triggering event.

7. The method of claim 6 wherein the triggering event is an air mass change of one or more tires.

8. The method of claim 6 wherein the tire inflation data is received periodically after the triggering event.

9. A tire notification system comprising:
a processor configured to:
receive input from a vehicle user to define a desired pressure value comprising a tire pressure based on vehicle speed and load;
receive tire inflation data of one or more tires;
calculate a specific value associated with an inflation event of the one or more tires based on the inflation data compared to the desired pressure value; and
output the specific value to a vehicle component.

10. The tire notification system of claim 9 wherein the specific value is a numeric pressure value of the one or more tires measured in a unit of pressure.

11. The tire notification system of claim 10 wherein the numeric pressure value is a difference between the desired pressure value and a pressure value of the one or more tires measured at one or more instances during the inflation event.

12. The tire notification system of claim 9 wherein the processor is further configured to receive periodic sampling of a pressure value of the one or more tires, wherein the tire inflation data includes the sampled pressure value.

13. The tire notification system of claim 12 wherein the tire inflation data further includes a duration of inflation of the one or more tires.

14. The tire notification system of claim 12 further comprising periodically sampling the pressure value of the one or more tires according to a sampling mode.

15. The tire notification system of claim 9 wherein the inflation data is received via one or more data packets transmitted from one or more tire pressure monitoring sensors.

* * * * *